United States Patent [19]
Lester et al.

[11] 3,961,597
[45] June 8, 1976

[54] LIQUEFIED GAS ALARM DEVICE

[75] Inventors: William W. Lester, Wellesley; Lawrence V. Mason, Marblehead, both of Mass.

[73] Assignee: The Gillette Company, Boston, Mass.

[22] Filed: June 27, 1974

[21] Appl. No.: 483,840

[52] U.S. Cl. .............................. 116/103; 116/112; 116/142 FP; 222/3
[51] Int. Cl.² .................. B67D 05/10; G08B 17/00
[58] Field of Search ............ 116/142 FP, 103, 102, 116/101, 106, 112; 340/229; 62/125; 222/3, 386.5

[56] References Cited
UNITED STATES PATENTS

| | | | |
|---|---|---|---|
| 365,399 | 6/1887 | McDonald | 116/103 |
| 2,121,673 | 6/1938 | White | 222/3 |
| 2,248,073 | 7/1941 | Gage | 116/142 FP |
| 2,815,152 | 12/1957 | Mills | 222/386.5 |
| 2,993,466 | 7/1961 | Sklaroff et al. | 116/103 X |
| 3,235,137 | 2/1966 | Bonduns | 222/386.5 X |
| 3,244,137 | 4/1966 | Garvey | 116/106 |
| 3,536,028 | 10/1970 | Adaglio | 116/109 |

*Primary Examiner*—Richard C. Queisser
*Assistant Examiner*—Daniel M. Yasich
*Attorney, Agent, or Firm*—Richard A. Wise; Oistein J. Bratlie; Mandel E. Slater

[57] ABSTRACT

In a temperature-sensitive alarm device incorporating a horn driven by a propellant which is stored in the liquid state in a pressure vessel, full utilization of the propellant for sounding the horn is obtained by incorporating into the pressure vessel a heat reservoir, such as a sealed bag of water, in order to release heat for maintaining rapid vaporization of the propellant.

2 Claims, 1 Drawing Figure

U.S. Patent June 8, 1976 3,961,597
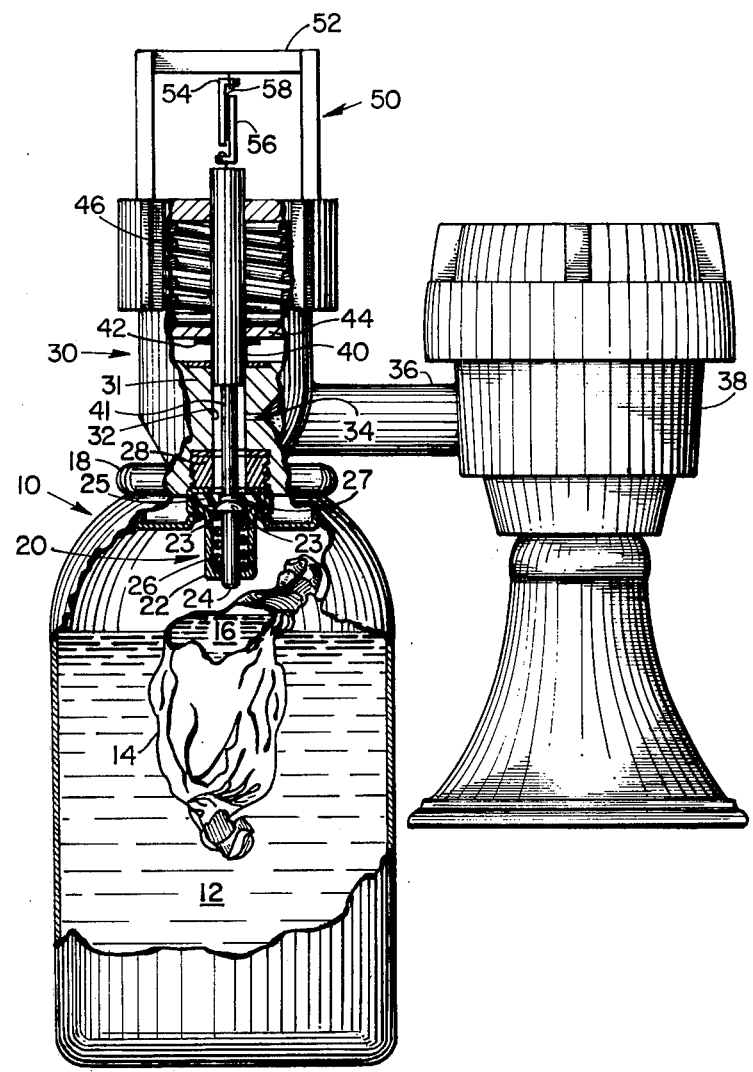

LIQUEFIED GAS ALARM DEVICE

BACKGROUND OF THE INVENTION

1. Field of the Invention

This invention relates to temperature-actuated alarm devices, and is directed more particularly to small, portable, self-contained, gas pressure-powered, temperature-sensitive alarm systems.

2. Description of the Prior Art

Temperature-sensing of fire alarm systems incorporating gas pressure-powered sound-emitting devices, and activated by a temperature-sensing element, have found widespread use in commercial and residential applications. In order for these systems to provide the intended protection, it is necessary that they reliably produce a loud warning signal and, further, that the warning signal be of sufficient duration that persons intended to be alerted by the signal have ample time to take notice of it. Certain consumer testing organizations that provide certification for such devices and labeling attesting to the fact that the devices meet their quality standards, require that certification be conditioned upon a duration of signal of at least 4 minutes (at a sound pressure level of 85 decibels or greater).

A number of commercially-available alarm devices using a gas pressure-powered horn meet this duration of signal requirement by providing a large pressure vessel and quantity, i.e., a pound or more, of liquified gas propellant. The large pressure vessel has disadvantages, however, in its size and in that it generally contains much more propellant than is actually necessary to drive a horn of a suitably loud type for the required time. As a result, the alarm device is more costly to manufacture, due to the larger pressure vessel and extra propellant, and it is also bulky. The theoretical propellant requirements of a small, but sufficiently loud horn, in terms of the total amount of gas required to sound the horn for the minimum time, may be met with a much smaller reservoir. We have found that in accordance with our invention, an adequate amount of liquified propellant may be contained in a reservoir of about 6 ounces nominal capacity to meet the required quality standards.

When an alarm device of the type above described and using a propellant reservoir of about 6-ounce size is triggered at a temperature of about 136°F, the horn sounds for only a few seconds and then stops. Since the initial rapid vaporization of propellant withdraws heat rapidly from the remaining liquid propellant, according to well-known principles, it is likely that this unsatisfactory performance is due to the lack of sufficiently rapid heat transfer from the surroundings into the small propellant reservoir to maintain vaporization of the remaining cold propellant at a rate sufficient to provide adequate gas flow to the horn.

SUMMARY OF THE INVENTION

Accordingly it is the object of the present invention to provide a gas pressure-powered alarm device of inexpensive construction and with a small propellant reservoir that will deliver gas at a rate and duration adequate to drive a loud horn for a time sufficient to meet required commercial standards.

With the above object in view, as will hereinafter appear, a feature of the present invention is the provision in an alarm device of the type above referred to of a heat reservoir in the pressure vessel, in order to release heat during vaporization of the propellant. With a source of heat in intimate contact with the liquid propellant, the temperature inside the pressure vessel is prevented from dropping so low that the horn can no longer be driven.

While numerous materials, including a wide variety of solids and liquids, may be employed as the heat reservoir, water has many advantages. First, for these purposes, it is cheap and readily available. It also has a very high specific heat relative to most other materials, and in particular, to most propellant materials that are in the form of liquified gases stored under pressure, making it very effective as a heat reservoir. Another advantage of water, and further adding to its advantages as a heat reservoir, is the phase change to ice that it undergoes at 32°F, during which it must give up to its surroundings 79.7 calories per gram before the resulting ice can drop still further in temperature. The result is that should the propellant temperature fall as low as 32°F, further substantial temperature drop is unlikely, because at that temperature a great amount of heat is available for transfer from the water to the propellant, even with relatively small amounts of water.

Particularly well-suited for use as the propellant in a gas pressure powered alarm device are materials selected from a group of commercially manufactured chlorofluorohydrocarbons sold under the trade name "Freon", which are stable, non-corrosive and non-flammable. A typical member of this group which might be selected, for example, is Freon 12, which has the following physical properties:

| | |
|---|---|
| Boiling Point | −21.6°F |
| Heat of Vaporization ($\Delta H_v$) | 39.5 cal/gm (at −21.6°F) |
| Vapor Pressure at 32°F | 30.1 PSIG |
| Vapor Pressure at 70°F | 70.2 PSIG |
| Vapor Pressure at 136°F | 195.3 PSIG |
| Density | 1.325 gm/ml (at 70°F) |
| Specific Heat | 0.232 |

In preferred embodiments where Freon 12 is employed as the propellant, water is the heat reservoir and the alarm device is designed to be activated at a temperature of 136°F, even if the temperature drop after activation should be down to the freezing point of water, there will remain a very substantial propellant gas pressure. Since water has a specific heat of 1.0 and a heat of fusion ($\Delta H_f$) of 79.7 cal/gm, it will be seen from comparing the specific heat values, and $\Delta H_v$ for Freon 12 with $\Delta H_f$ for water, that only a relatively small amount of water is required to provide an effective heat reservoir for a much larger amount of Freon 12.

When water is used as the heat reservoir, it is preferable to enclose it in a small sealed container, such as a sealed plastic bag, which is then placed inside the pressure vessel, where it may preferably remain free. This has the advantages of avoiding both the corrosion problems that can arise when an aqueous product is contained in a steel can and the possibility of causing blockage by freezing water that may inadvertently get into the passageway between the pressure vessel and the horn. It is to be understood that it is not intended that the contents of the bag are themselves to be dispensed, nor does the bag assist dispensing by expanding from the internal pressure of a propellant in order to force a product to be expelled from the can.

The above and other features of the invention, including various novel details of construction and combinations of parts, will now be more particularly described with reference to the accompanying drawing and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention from which its novel features and advantages will be apparent.

The single FIGURE is an elevational view, partially broken away and partially in section, of one form of alarm device, illustrative of an embodiment of the invention.

DESCRIPTION OF A PREFERRED EMBODIMENT

Referring to the drawing it will be seen that the illustrative alarm device includes a pressure vessel 10, which in this example has a nominal capacity of about 6 ounces and a total internal volume, including headspace, of almost 7½ ounces. A liquified propellant 12 in equilibrium with its vapor is contained in the pressure vessel, and also located in the pressure vessel is a heat reservoir in the form of a sealed polyethylene bag 14 containing water 16. When the propellant is Freon 12 and the bag contains water, it is convenient to use about 180 grams of the Freon 12 and about 50 grams of water.

A conventional valve mounting cup 18 is secured to the top of pressure vessel 10, and crimped to the valve mounting cup is a valve 20, which controls the flow of propellant from the pressure vessel. The valve includes a valve housing 22 having ports 23 communicating with the interior of the housing. A valve stem 24 with rounded head and adapted for axial movement with respect to housing 22 is biased upwardly against valve gasket 25 by valve spring 26, sealing the central hole 27 in valve gasket 25.

A threaded bushing 28 is welded to the top of valve mounting cup 18 to receive thermostat assembly 30, which includes a lower solid portion 31 having a central bore 32 in axial alignment with bushing 28 and valve 20. Orifice 34 leads from central bore 32 through hollow tube 36 to horn 38. Disposed within bore 32 is plunger 40 which has a lower portion 41 of reduced diameter small enough to pass through, without sealing, central hole 27 in gasket 25 and depress valve stem 24. The upper portion of plunger 40 has a flange 42, supporting washer 44, against which spring 46 is compressed, so that plunger 40 is biased downwardly by spring 46.

A fuse sub-assembly 50 extends exteriorly of thermostat assembly 30 for exposure to ambient temperature conditions. The fuse sub-assembly includes an inverted U-shaped frame 52 to which is attached a first fuse link 54, and a second fuse link 56 is attached to the top of plunger 40. A strip 58 of fusible alloy, selected to melt at about 136°F, bonds the fuse links 54, 56 together, thereby holding plunger 40 in tension against the force of spring 46.

When the ambient temperature reaches 136°F, the strip 58 of fusible alloy melts, releasing the bond between fuse links 54 and 56 and thereby also releasing plunger 40, which is moved downwardly in central bore 32 by the force of spring 46 until flange 42 bottoms against solid portion 31 of thermostat assembly 30. As this takes place, lower portion 41 of plunger 40 passes down through central hole 27 in gasket 25 and depresses valve stem 24, opening valve 20. Propellant then passes through ports 23, the interior of valve housing 22, central hole 27, bushing 28, central bore 32, orifice 34, and tube 36 to horn 38, causing the horn to emit a loud warning signal.

When the gas is thus released, the conversion of the Freon 12 from the liquid to the gaseous state is accompanied by great absorption of energy, thereby cooling the remaining Freon 12 and reducing its pressure. The bag 14 of water, though small, stores a great deal of heat relative to the requirements of the Freon 12, as hereinbefore described, and its presence inside the pressure vessel provides a source of heat whereby to maintain adequate pressure in the system to sustain operation of the horn.

It is to be understood that the present invention is by no means limited to the particular construction herein disclosed and/or shown in the drawing, but also comprises any modifications or equivalents within the scope of the disclosure.

Having thus described our invention, we claim:

1. An alarm device comprising a pressure vessel, valve means at the outlet of said pressure vessel, gas-pressure-powered signal means, conduit means connecting said signal means through said valve means to said pressure vessel, a liquefied propellant gas in said pressure vessel for operating said signal means, means responsive to an external condition to open said valve means, whereby said signal means is caused to emit a signal, and a sealed plastic bag containing water as a heat reservoir in said pressure vessel to release heat during vaporization of said liquefied propellant gas, whereby to maintain rapid vaporization of said liquefied propellant gas for operating said signal means.

2. An alarm device as defined in claim 1, in which said liquefied propellant gas is a chlorofluorohydrocarbon.

* * * * *